United States Patent [19]

Furman

[11] Patent Number: 5,782,987
[45] Date of Patent: Jul. 21, 1998

[54] MIG WELDER WIRE CLEANING APPARATUS AND METHOD

[76] Inventor: James Edmond Furman, 280 Kosikar Road, Lindell Beach, British Columbia, Canada, V2R 5B8

[21] Appl. No.: 850,774

[22] Filed: May 2, 1997

[51] Int. Cl.⁶ .................... B08B 1/02; B23K 9/00
[52] U.S. Cl. .................... 134/15; 219/136
[58] Field of Search ................ 134/15; 219/136, 219/137.43

[56] References Cited

U.S. PATENT DOCUMENTS

| | | | |
|---|---|---|---|
| 2,646,649 | 8/1953 | Rhodes et al. | 451/3 |
| 2,829,236 | 4/1958 | Spencer | 219/74 |
| 3,204,080 | 8/1965 | Spencer | 219/121.11 |
| 3,239,120 | 3/1966 | Bosteels | 219/136 X |
| 5,304,254 | 4/1994 | Chino et al. | 134/15 X |

FOREIGN PATENT DOCUMENTS

| | | |
|---|---|---|
| 0074106 | 3/1983 | European Pat. Off. |
| 242990 | 2/1987 | Germany |
| 5976659 | 5/1984 | Japan |

*Primary Examiner*—Jill Warden
*Assistant Examiner*—Saeed Chaudhry

[57] ABSTRACT

A cleaning method and apparatus for a MIG welding apparatus has a pressurized gas conduit which directs a jet of compressed air at a welding wire extending between an outfeed of drive rolls and an inlet of the wire liner of a conventional MIG welder. The nozzle has an adjustment structure to facilitate adjustment of an angle of discharge of the air jet relative to the wire axis, one type of structure being at least one loop within the conduit. One or more loops within the conduit also effectively increase length of the conduit so as to enhance vibration of the nozzle which causes transverse oscillation of the nozzle. Oscillation of the nozzle causes the air jet to sweep rapidly back and forth across the wire, removing any foreign matter carried on the wire. This reduces chances of the wire jamming in the liner which tends to occur with prior art MIG welder due to foreign matter on the wire being carried into the liner.

20 Claims, 3 Drawing Sheets

MIG WELDER WIRE CLEANING APPARATUS AND METHOD

BACKGROUND OF THE INVENTION

The invention relates to a cleaning apparatus for a MIG welding apparatus, that is a "metallic inert gas" welding apparatus, in which a consumable wire electrode is fed to a welding gun through a flexible tube or wire liner and is shielded by inert gas.

In a convention MIG welding apparatus, welding wire is fed by at least one pair of cooperating drive rolls, although usually two aligned pairs are used in tandem. The drive rolls draw welding wire from a wire supply spool through a nip formed by engaging faces of each cooperating pair of the rolls. The wire leaves an outfeed of the rolls and passes into an aligned inlet of a flexible wire liner which in turn leads to a welding gun held by an operator. The engaging faces of the rolls are usually knurled to enhance grip of the rolls on the wire so as to feed the wire without slippage from the spool into the liner. The liner is a flexible tube having an inside diameter only slightly greater than diameter of the wire so as to guide the wire smoothly through the liner. Consequently, any foreign matter such as dirt or surface material from the wire disturbed by the knurled surfaces of the feed rolls is often carried by the wire into the liner. If the foreign matter is excessive and tends to accumulate within the liner, the foreign matter eventually causes the wire to jam in the liner, preventing further feeding to the welding gun. If this jamming occurs, the operator must stop the equipment, and pull the jammed wire backwardly out through the liner, i.e. in an opposite direction to the feed direction, so as to clear the blockage before re-threading the liner with wire. This is a time-consuming procedure, and with normal welding activity, it can occur several times a month.

SUMMARY OF THE INVENTION

The invention reduces the difficulties and disadvantages of the prior art by providing a relatively simple apparatus for cleaning wire of a MIG welding apparatus. The cleaning apparatus can be retro-fitted to an existing MIG welding apparatus by following a simple installation procedure. The apparatus is powered by an existing electrical power supply which is normally used to power the drive rolls of apparatus. In addition, the cleaning apparatus requires a supply of compressed air from a normal welding/machine shop air compressor, and thus retro-fitting does not require installation of costly ancillary equipment. The cleaning apparatus can be easily incorporated during manufacture of a MIG welding apparatus at a very low cost, and thus does not add materially to overall purchase price of the welding apparatus. When the cleaning apparatus is installed it does not require any special servicing or attention by the operator, but instead permits the operator to weld using normal welding techniques, and thus is essentially unobtrusive to normal welding.

A cleaning apparatus according to the invention is used with a MIG welding apparatus which has at least one pair of cooperating drive rolls to receive and feed a welding wire engaged by the rolls along a welding wire axis. The axis leads into a wire liner spaced closely adjacent the drive rolls. The cleaning apparatus comprises a gas conduit having an inlet to receive compressed gas and a nozzle to discharge the gas as a gas jet. The nozzle is directed at a portion of the welding wire axis extending between an outfeed of the drive rolls and an inlet of the wire liner.

Preferably, the nozzle has adjustment means to facilitate adjustment of an angle of discharge of the gas jet at the wire axis. The conduit has an anchor fixed relative to the MIG welding apparatus and the adjustment means of the gas conduit comprises at least one loop of conduit provided between the nozzle and the anchor to facilitate bending of the conduit to adjust direction of the gas discharge from the nozzle.

Preferably, the apparatus further comprises oscillation means to oscillate the nozzle generally transversely of the wire axis. A valve cooperates with the gas conduit to control flow of gas through the conduit, the valve being synchronized to open when the drive rolls rotate to feed the welding wire.

A method according to the invention is for cleaning a welding wire of a MIG welder and comprises the steps of:

moving the welding wire by engaging the wire with at least one pair of cooperating drive rolls, feeding the wire from the drive rolls along a welding wire axis into a wire liner spaced downstream from the rolls, and directing a jet of gas to impinge a portion of the wire extending between an outfeed of the drive rolls and an inlet of the wire liner to clean the wire prior to entering the line.

The method is further characterized by oscillating the jet of gas generally transversely of the wire axis so as to assist in cleaning the wire. In addition, the method is further characterized by synchronizing delivery of the jet of gas with feeding the wire through the drive rolls. In addition, the method is characterized by directing the jet of gas generally towards a nip between the engaging faces of the drive rolls, on an outfeed thereof, and in a direction generally opposite to the direction of travel of the wire.

A detailed disclosure following, related to drawings, describes a preferred embodiment of the invention which is capable of expression in structure other than that particularly described and illustrated.

DETAILED DESCRIPTION

Figure 1:
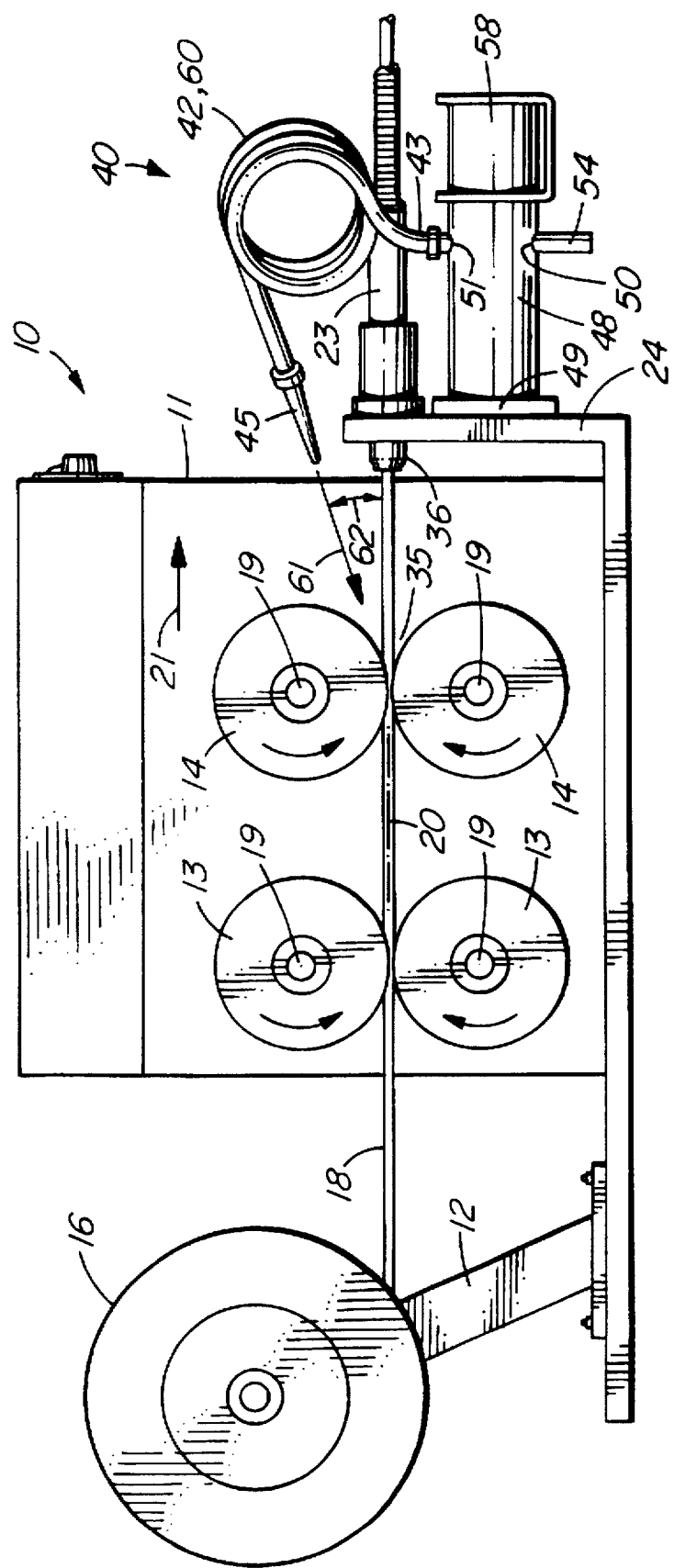
FIG. 1 is a simplified fragmented side elevation of a conventional MIG welding apparatus equipped with a cleaning apparatus according to the invention, a welding gun of the apparatus being omitted.
Figure 2:
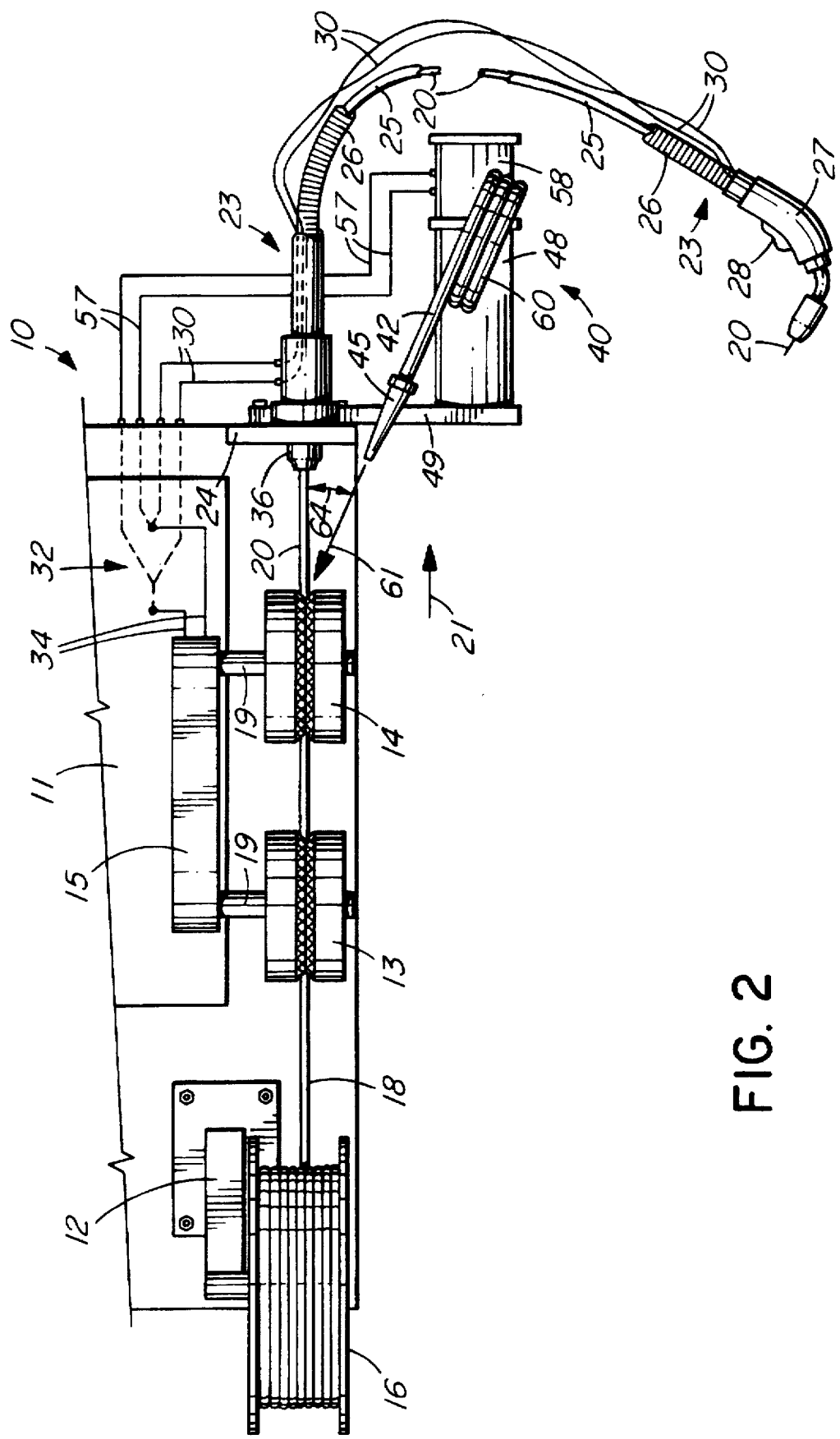
FIG. 2 is a simplified fragmented top plan of the apparatus of FIG. 1, also showing a portion of a welding gun and liner and a schematic representation of certain electrical conductors.
Figure 3:
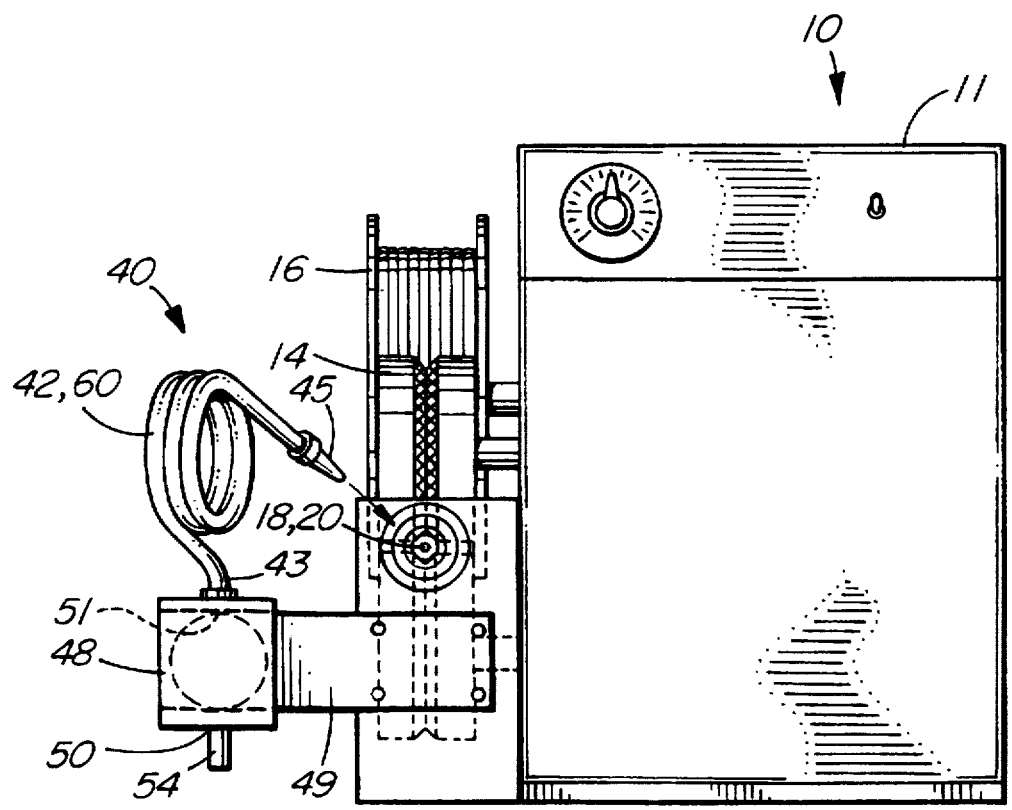
FIG. 3 is a simplified fragmented end elevation of the apparatus.

Referring mainly to FIGS. 1 and 2, a conventional prior art MIG welding apparatus 10 comprises a body 11, and first and second pairs of cooperating drive rolls 13 and 14 respectively journalled for concurrent rotation with respect to the body in direction of undesignated arrows. The apparatus 10 further comprises a bracket 12 which journals a wire supply spool 16 carrying a coil of welding wire 18, which feeds off the spool and along a welding wire axis 20 extending between and downstream of the drive rolls 13 and 14. The drive rolls are mounted on journalled spindles 19 which are powered for synchronised rotation by an electrical motor and gears (shown diagrammatically in FIG. 2 at 15) to feed the wire in direction of arrow 21. The apparatus 10 includes a power cable 23 which extends from a bracket 24 on the body to a welding gun 27 which is held by an operator for welding a work piece, not shown. The power cable 23 further comprises a gas conduit 26, a wire liner 25 within the conduit 26 and carrying the wire 18, and a pair of electrical wires 30 extending alongside the conduit 26. The cable 23 has a tough outer sheath to protect the wires, conduit and liner, while providing flexibility to facilitate manipulation of the welding gun 27. The welding gun cooperates with an outlet of the liner 25 and has a trigger 28 which is connected by the electrical wires 30 to a power supply 32 to control power supplied to the electrical motor and gears 15 through electrical wires 34. The liner 25 is a low friction flexible tube which has a smooth inside diameter which is slightly greater than the diameter of the wire 18 to permit free movement of the wire therealong. The wire 18 passes from an outfeed or "nip" 35 of the pair of rolls 14, along the axis 20, and into an entry 36 of the liner 25 which is aligned with the axis 20 and spaced downstream from the rolls 14. The wire then passes through the liner to exit from the gun 27 as shown.

The above describes a conventional prior art MIG welding apparatus which, as previously described, is prone to relatively frequent jamming of the wire within the liner. This jamming is due to foreign matter being carried by the wire into the liner, the matter accumulating and eventually restricting movement between the wire and the liner. Each of the drive rolls has a respective knurled groove, the surface of which forcibly engages the surface of the welding wire to enhance traction between the wire and the drive rolls. The rolls can damage the surface of the wire which results in small particles of the surface material being disturbed and standing proud of the surface of the remaining portion of the wire. These small particles are carried into the liner and eventually can cause the blockage.

A cleaning apparatus 40 according to the invention is adapted to clean the wire prior to entry into the liner, so as to essentially prevent or at least reduce considerably contamination of the liner, thus reducing frequency of jamming and cleaning. The cleaning apparatus 40 comprises a gas conduit 42 having an inlet 43 to receive compressed gas, and a nozzle 45 to discharge the gas as a jet. The apparatus 40 further comprises a valve 48 which is mounted on a bracket 49 extending from the body 11, the valve having an inlet 50 and an outlet 51. The inlet 50 cooperates with a pressurized gas line 54 extending from a conventional shop air compressor, which compresses atmospheric air to be within a range of between about 100 and 120 p.s.i., which compressed air is commonly distributed to convenient areas of a workshop for a multitude of uses. Thus the gas line 54 receives air from the conventional compressor reservoir, and thus pressure of the air fluctuates depending on usage and recovery of the reservoir. The pressure and flow rate of the air is not critical, provided a minimum delivery pressure of about 80 p.s.i. is available at the valve 48. The outlet 51 of the valve is connected to the inlet 43 of the conduit, which is essentially cantilevered from the valve. Thus, the valve 48 serves as an anchor for the conduit 42 and is fixed relative to the MIG welding apparatus so that the cantilevered conduit extends freely from the anchor to the nozzle 45.

The valve 48 is a 2-way, 2-position, solenoid valve which is normally closed and cooperates with the gas conduit 42 to control flow of gas through the conduit as will be described. Electrical wires 57 extend between an actuator, e.g. a solenoid 58 of the valve 48 and the supply 32, and thus are connected in parallel with the wires 30 extending to the trigger. Thus, an electrical conductor extends between the electrical motor and gears 15 and the solenoid 58, and when power is supplied to the motor, power is simultaneously supplied to the solenoid 58. This synchronizes opening of the valve 48 with start of rotation of the drive rolls.

The gas conduit 42 has a plurality of loops of conduit 60 located between the inlet 43 and the nozzle 45 to increase effective length of the conduit extending between the anchor and the nozzle. This permits the nozzle 45 to move more easily relative to the inlet 43 than would the case with a shorter length of conduit. The loops serve two functions, the first function being to augment any lateral oscillation that might occur at the nozzle for reasons to be described. The second function is that the plurality of coils facilitates bending of the conduit to attain a particular direction of gas discharge from the nozzle. The conduit 42 is preferably a relatively soft copper having an external diameter of approximately ³⁄₁₆ths of an inch (4.5 mm), and the nozzle is a tapered tip, generally similar to a gas welding torch tip, having a bore of about ¹⁄₁₆th of an inch (1.5 mm) to produce a narrow but expanding jet of compressed air.

The nozzle has a discharge axis inclined at an angle 62 to the wire 18 (or axis 20) extending from the outfeed or nip 35 of the drive rolls, the angle being measured within a vertical plane as seen in FIG. 1. In addition, the nozzle is inclined at an angle 64 to the axis 20, the angle being measured within a horizontal plane as seen in FIG. 2. Preferably, the angle 62 of FIG. 1 is about 20 degrees, but can be between 10 and 45 degrees. Similarly, the angle 64 of FIG. 2 is preferably about 25 degrees, but can be between about 10 degrees and 45 degrees. It can be seen that the direction of discharge of the air jet is aimed at the axis 20 and in a direction generally opposite direction of feed of the wire along the axis, shown as the arrow 21.

OPERATION

The MIG welding apparatus is operated in a normal manner, and because operation of the cleaning apparatus 40 is essentially automatic, it does not require any special attention from the welding operator. Normal maintenance is required for the solenoid valve, and initial setting of the angle of inclination of the nozzle 45 is required. The apparatus 40 might need occasional re-adjustment should it be accidentally disturbed. Thus, when the operator depresses the trigger 28 of the welding gun 27, power is transmitted to the motor and gears 15 to drive the rolls and feed the wire 18. Simultaneously, power is supplied to the solenoid valve 48 which is shifted from the closed to the open position, so as to admit pressurized air from the line 54 into the conduit 42 to discharge from the nozzle 45. Thus, power is supplied to the motor and gears 15 and the valve 48 simultaneously, thus synchronizing the start of the jet of gas with the start of the feeding of the wire through the drive rolls. Thus, compressed air from the line is not wasted, but is instantly available when required, thus avoiding unnecessary operation of the shop compressor.

As indicated previously, the nozzle 45 is mounted at an end of a relatively long length of the gas conduit 42, which is coiled into the loops 60 to enable easy adjustment of the angle of inclination of the jet impinging the wire. Thus the loops serve as adjustment means to facilitate adjustment of the angle of discharge of the gas relative to the wire axis. While one loop would be sufficient, preferably a plurality of loops are provided so as to increase length of the conduit to facilitate adjustment and to augment vibration of the nozzle which will automatically occur due to general vibrations inherent in the apparatus when it operates. In other words, when the rolls 13 and 14 rotate, any vibration of the body 11 is transferred through the bracket 49 to the valve 48, and then to the conduit 42 and the nozzle 45. The length of the conduit amplifies any small vibration that is transmitted to the inlet 43, so that the nozzle 45 at the outer end has a greater amplitude of vibration than the valve. Because the conduit is effectively cantilevered from the valve, the vibration tends to be generally laterally of the nozzle, and thus the vibrations are also generally laterally of the welding wire 18. Thus the nozzle tends to oscillate laterally or generally transversely of the wire axis 20 which in turn oscillates the jet of gas generally transversely of the wire axis. Thus, the jet from the nozzle sweeps back and forth rapidly over the wire 18 as the wire moves from the outfeed or nip 35 of the rolls, which tends to improve cleaning when compared with a fixed nozzle which is inclined in one direction. Clearly, any air turbulence from the air jet is generated on all sides of the wire as the nozzle oscillates, and this turbulence enhances disturbance of any dirt or other matter carried on the wire, thus helping to clean the wire. Clearly, because the air jet operates at about 80 p.s.i. when delivered through the nozzle, care must be taken to ensure that this pressure is adequate and accurately directed to clean persistent dirt that tends to cling to the wire.

Thus, it can be seen that the cleaning apparatus directs the jet of air or gas through a nozzle aimed at the wire axis, and permits the nozzle to vibrate transversely (or oscillate laterally), so as to oscillate the jet of air or gas generally transversely or laterally of the wire axis so as to assist in cleaning the wire. It can be seen that the nozzle directs the jet of gas at a portion of the welding wire axis 20 extending between an outfeed of the drive rolls, and an inlet of the wire liner. Clearly, providing a relatively long length of conduit, which is coiled to occupy relatively small space, serves as an oscillating means to oscillate the nozzle generally transversely of the wire axis so that the jet of gas sweeps the axis rapidly back and forth to enhance removal of dirt from the wire.

ALTERNATIVES

The invention as illustrated is particularly shown for retro-fitting the cleaning apparatus 40 to an existing MIG welding apparatus 10. In this arrangement, the invention is fitted on a side of the wire axis remote from the body 11, and thus the jet of air is directed towards the body 11. Locating the conduit and associated valve on a side of the wire remote from the body 11 increases overall width of the apparatus, which may be undesirable in some circumstances. Clearly, the conduit and associated valve could be located in a different position so as to have a negligible effect on the overall width of the apparatus. If the apparatus is to be incorporated into a MIG welder during the manufacturing stage, clearly the body 11 can be modified to accept a conduit and associated valve on an opposite side of the wire so as not to increase overall size of the apparatus.

The valve 48 is shown to be a solenoid valve, and thus uses an electromagnet as a valve actuator. Clearly, other types of electrically actuated valves can be substituted. In some circumstances, especially when the invention is to be incorporated directly in a welding apparatus, in an alternative the valve could be mechanically actuated by structure responsive to rotation of the rolls.

What is claimed is:

1. A cleaning apparatus for a MIG welding apparatus, the welding apparatus having at least one pair of cooperating drive rolls to receive and feed a welding wire engaged by the rolls along a welding wire axis leading into a wire liner spaced closely adjacent the drive rolls, the cleaning apparatus comprising:

(a) a gas conduit having an inlet to receive compressed gas and a nozzle to discharge the gas as a gas jet, the nozzle being directed at a portion of the welding wire axis extending between an outfeed of the drive rolls and an inlet of the wire liner.

2. An apparatus as claimed in claim 1, in which:

(a) the nozzle has adjustment means to facilitate adjustment of an angle of discharge of the gas jet relative to the wire axis.

3. An apparatus as claimed in claim 2, in which:

(a) the conduit has an anchor fixed relative to the MIG welding apparatus, and (b) the adjustment means of the gas conduit comprises at least one loop of conduit provided between the nozzle and the anchor to facilitate bending of the conduit to adjust direction of the gas discharged from the nozzle.

4. An apparatus as claimed in claim 1, further comprising:

(a) oscillation means to oscillate the nozzle substantially transversely of the wire axis.

5. An apparatus as claimed in claim 3, in which:

(a) the gas conduit has a plurality of loops of conduit to facilitate bending and to increase the effective length of conduit extending between the anchor and the nozzle to serve as an oscillation means to oscillate the nozzle substantially transversely of the wire axis.

6. An apparatus as claimed in claim 1, further comprising:

(a) a valve cooperating with the gas conduit to control flow of gas through the conduit, the valve being synchronized to open when the drive rolls rotate to feed the welding wire.

7. An apparatus as claimed in claim 6, in which:

(a) the valve is an electrically actuated, normally-closed valve, (b) the drive rolls are driven by an electrical motor, and (c) an electrical conductor extends between the electrical motor and an actuator of the valve to synchronize opening of the valve with start of rotation of the drive rolls.

8. An apparatus as claimed in claim 1, in which:

(a) the nozzle of the conduit has an internal diameter of between about 1 and 3 millimeters.

9. A MIG welding apparatus comprising:

(a) at least one pair of cooperating drive rolls disposed symmetrically about a welding wire axis, (b) a wire liner having an inlet aligned with the wire axis and disposed substantially adjacent an outfeed of the drive rolls, the liner having an outlet, (c) a spool of welding wire mounted adjacent the drive rolls, a portion of the wire being received between and engaged by the drive rolls, and passing along the wire axis and through the wire liner, (d) a welding gun cooperating with the outlet of the wire liner to direct the welding wire fed from the wire liner, and (e) a cleaning apparatus comprising a gas conduit having an inlet to receive gas and a nozzle to discharge the gas as a gas jet, the nozzle being directed at a portion of the welding wire extending between the outfeed of the drive rolls and the inlet of the wire liner.

10. A welding apparatus as claimed in claim 9, in which:

(a) the nozzle has adjustment means to facilitate adjustment of an angle of discharge of the gas jet onto the wire.

11. A welding apparatus as claimed in claim 10, in which:

(a) the conduit has an anchor fixed relative to the MIG welding apparatus, and (b) the adjustment means of the gas conduit comprises at least one loop of conduit provided between the nozzle and the anchor to facilitate bending of the conduit to adjust direction of discharge from the nozzle.

12. A welding apparatus as claimed in claim 9, further comprising:

(a) a valve cooperating with the gas conduit to control flow of gas through the conduit, the valve being synchronised to open when the drive rolls rotate to feed the welding wire.

13. A welding apparatus as claimed in claim 12, in which:

(a) the valve is an electrically actuated, normally-closed valve, (b) the drive rolls are driven by an electrical motor, and (c) an electrical conductor extends between the electrical motor and an actuator of the valve to synchronize opening of the valve with rotation of the drive rolls.

14. A welding apparatus as claimed in claim 9, in which:

(a) the nozzle is directed at the wire extending from the outfeed of the drive rolls at an angle of between about 10 degrees and 45 degrees to the wire axis, in a direction substantially opposite to direction of feed of the wire along the axis.

15. A method of cleaning a welding wire of a MIG welder, the method comprising the steps of:

(a) moving the welding wire by engaging the wire with at least one pair of cooperating drive rolls, (b) feeding the wire from the drive rolls along a welding wire axis into a wire liner spaced downstream from the rolls, and (c) directing a jet of gas to impinge a portion of the wire extending between an outfeed of the drive rolls and an inlet of the wire liner to clean the wire prior to entering the liner.

16. A method as claimed in claim 15, further characterised by:

(a) oscillating the jet of gas substantially transversely of the wire axis so as to assist in cleaning the wire.

17. A method as claimed in claim 16, further characterised by:

(a) directing the jet of gas through a nozzle aimed at the wire axis, and (b) permitting the nozzle to vibrate laterally so as to oscillate the jet.

18. A method as claimed in claim 15, further characterised by:

(a) synchronizing delivery of the jet of gas with feeding the wire through the drive rolls.

19. A method as claimed in claim 15, further characterised by:

(a) directing the jet of gas substantially towards a nip between the engaging faces of the drive rolls, at an outfeed thereof.

20. A method as claimed in claim 19, further characterised by:

(a) directing the jet of gas at an angle of between about 10 degrees and 45 degrees to the welding wire axis, in a direction substantially opposite to the direction of travel of the wire.

* * * * *